(12) United States Patent
Van Willigen et al.

(10) Patent No.: US 6,430,290 B1
(45) Date of Patent: Aug. 6, 2002

(54) CONDITIONAL ACCESS

(75) Inventors: Engelbertus Van Willigen, Hilversum; Robert Schipper, Eindhoven, both of (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/233,600

(22) Filed: Jan. 19, 1999

(30) Foreign Application Priority Data

Jan. 23, 1998 (EP) .............................. 98200181

(51) Int. Cl.[7] .......................... H04L 9/00; H04N 7/00; H04N 7/167
(52) U.S. Cl. ................ 380/1; 380/20; 380/10; 380/49
(58) Field of Search ................ 380/20, 10, 49

(56) References Cited

U.S. PATENT DOCUMENTS 5,412,724 A * 5/1995 Mary ......................... 380/20

OTHER PUBLICATIONS

"Functional Model of a Conditional Access System", EBU Technical Review, Winter 1995.

* cited by examiner

Primary Examiner—Ly V. Hua
(74) Attorney, Agent, or Firm—Daniel J. Piotrowski

(57) ABSTRACT

Conditional access is used to prevent unauthorized use, for example, reception of signals. A conditional access apparatus performs a combination of scrambling and encryption to obtain these results.

Known conditional access apparatuses use a control word generator to obtain the requested control words, and an encrypter to encrypt the control words. The encrypted control words are sent together with the information to make descrambling possible at the receiving side.

The invention proposes the use of a table of control words and encrypted control words as entitlement control words for realizing scrambling and descrambling.

5 Claims, 2 Drawing Sheets

CONDITIONAL ACCESS

The invention relates to a conditional access apparatus, a method of scrambling a signal, and a transmission system comprising a conditional access apparatus.

A conditional access (CA) apparatus performs a combination of scrambling and encryption to prevent unauthorized use, for example, reception of information. Scrambling is the process of rendering sound, pictures and/or data, etc. unintelligible. Encryption is the process of protecting the secret keys (control words) which have to be transmitted with the scrambled signal for the descrambler to operate, that is to say, to descramble the scrambled signal.

The primary purpose of a CA system for broadcasting is to determine which individual receiver(s)/set-top decoder(s) will be able to receive and supply particular program services, or individual programs to the viewers. After this determination, the chosen receivers will receive the information they need to operate.

Conditional access systems are known, for example, from the article "Functional model of a conditional access system", EBU Technical Review, Winter 1995.

This article describes a functional model of a CA "reference" system. At the transmitting side, basically a multiplexer multiplexes picture, sound and data information, generating an MPEG-2 transport stream. This MPEG transport stream is forwarded to a scrambler. After scrambling and modulation, the signal will be sent to the receiving side. At the receiving side, the signal will be demodulated, descrambled and demultiplexed. To improve the security of the system, an improved scrambling system has been described in this article wherein the scrambler uses control words (CW) to scramble the transport stream.

These control words are generated by a control word generator. The generated control words are supplied to an encrypter for encryption of the control words under the control of a service key (for example, a smart card), and the encrypted control words are supplied as entitlement control messages (ECMs) to the multiplexer. At the receiving side, a decrypter is needed to decrypt the ECMs to obtain the CWs. Also at this side, a service key (for example, a smart card) controls the decrypter.

This prior-art conditional access system operates pretty well in a studio environment where the control word generator and encrypter are placed in a secured room. However, when the CA system has to be used on a mobile basis, the control word generator and the encrypter are no longer in secured rooms. Consequently, there will be a great risk of theft of the conditional access apparatus and/or smart card.

The invention seeks, inter alia, to provide a conditional access apparatus which overcomes the disadvantage of the prior art. To this end, a first aspect of the invention provides a conditional access apparatus as defined in claim 1. A second aspect of the invention provides a transmission system as defined in claim 3. A third aspect of the invention provides a method of scrambling as defined in claim 4. By storing the unencrypted control words and the encrypted control words, it is no longer necessary to use a control word generator and an encrypter. A processor can determine the set of control word and entitlement control message that will be used for the next predetermined time. In the case of theft of a conditional access apparatus, a new table of control words is sent to the other operating conditional access apparatuses at the transmitting side. Thereafter, the stolen conditional access apparatus can no longer be used.

The unencrypted control words and the encrypted control words can be generated centrally by an authorized person who distributes the tables obtained to the authorized users. Consequently, the conditional access apparatus will also become cheaper.

An embodiment of the conditional access apparatus according to the invention has the features of claim 2.

Beforehand, the control word(s) and the encrypted control word(s) are written into the respective storing means. During operation of the conditional access apparatus, the control means control the means for reading out the storing means. The storing means may be read out in a random order and changed as often as is deemed necessary to prevent unauthorized persons from cracking the scrambling control words.

The invention and additional features which may be optionally used to implement the invention to advantage will be apparent from and elucidated with reference to the examples described hereafter and shown in the Figures.

Figure 1:
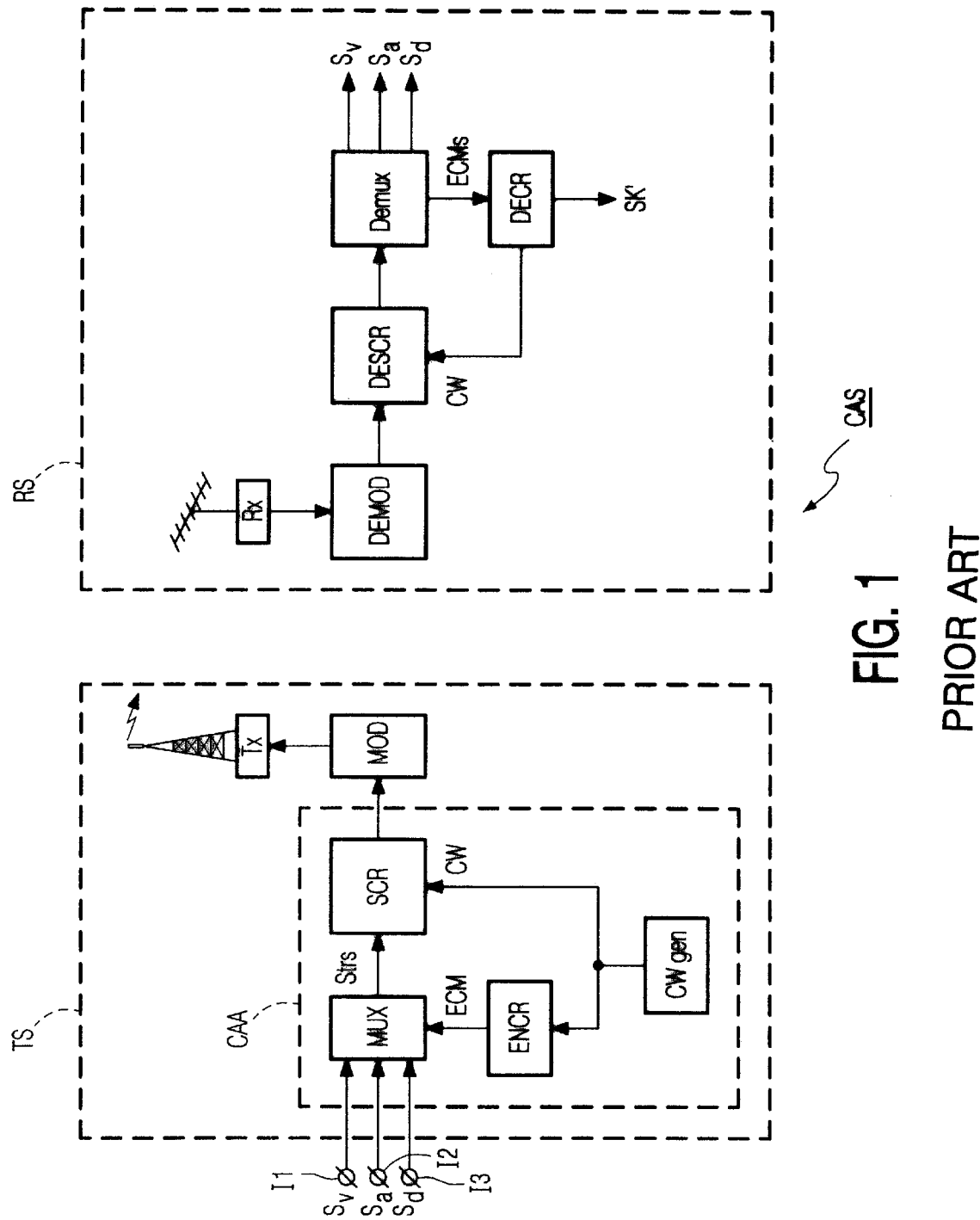
FIG. 1 shows a prior-art conditional access system.

In FIG. 1, a prior-art conditional access system CAS is shown, comprising a transmission system TS and a receiving system RS. The transmission system TS can receive a video input signal Sv, an audio input signal Sa and/or a data input signal Sd at inputs I1, I2, and I3, respectively. These inputs I1, I2 and I3 are coupled to multiplex means MUX wherein these signals are multiplexed together with a signal ECM. The multiplex means outputs a signal Strs which signal is supplied to scrambling means SCR for scrambling the signal Strs, using a control word CW. This control word is generated by a control word generator CWgen. The control word is also supplied to an encrypter ENCR for encrypting the control words and supplying entitlement control messages ECMs (encrypted control words), which, as described above, are supplied to the multiplex means MUX. The encrypting means can be controlled by a service key SK (for example, a smart card). The output signal of the scrambling means SCR is supplied via a modulator MOD to transmission means Tx for transmitting the obtained signal to the receiving system RS by air or alternatively by satellite or cable. At the receiving side, the received signal is handled inversely, i.e. first demodulated in a demodulator DEMOD, then descrambled in a descrambler DESCR, followed by demultiplexing in demultiplex means Demux. To recover the control word CW, a decrypter DECR is used which decrypts the ECMs to obtain the original control words CW, for example, under the control of a service key SK' (again, for example, a smart card).

Figure 2:
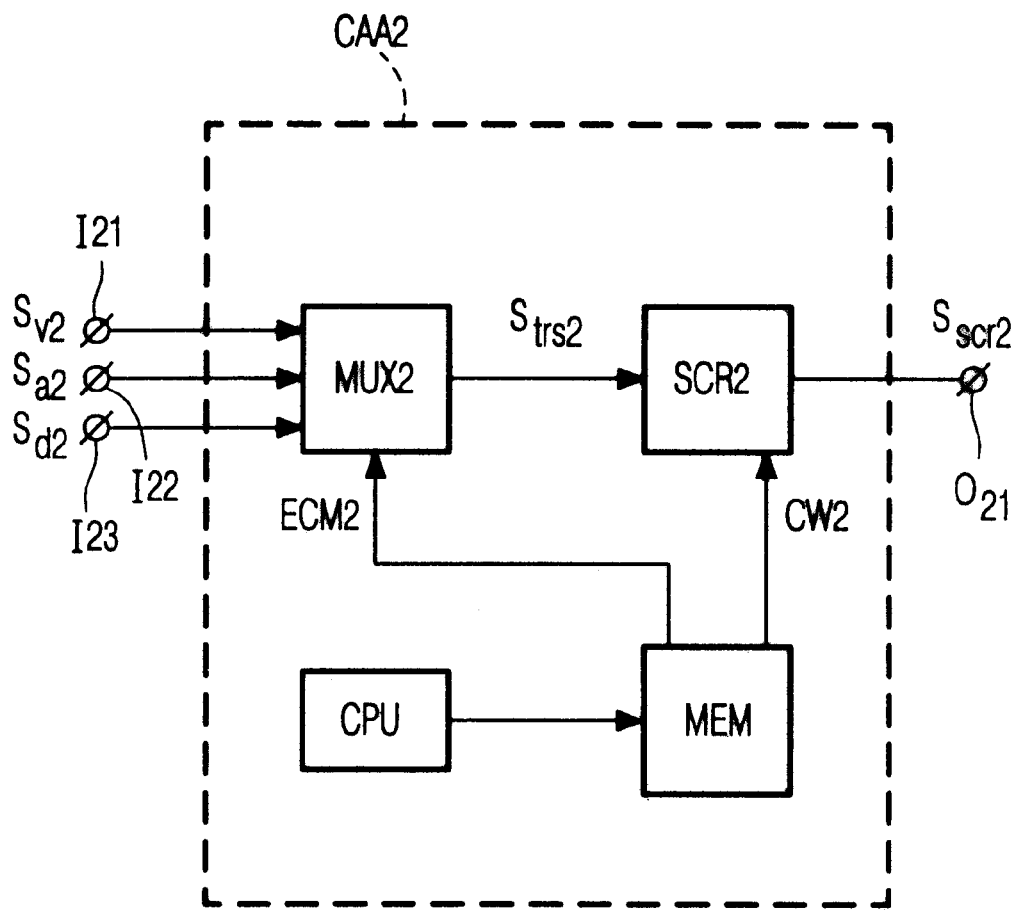
FIG. 2 shows a conditional access apparatus according to the invention.

FIG. 2 shows an example of a conditional access apparatus CAA2 according to the invention, having inputs I21, I22 and I23 for receiving video, audio and/or data input signals Sv2, Sa2 and Sd2, respectively. Elements corresponding to those in FIG. 1 have the same reference symbols. The inputs I21, I22 and I23 are coupled to multiplex means MUX2 for multiplexing the input signals with entitlement control messages in the form of an encrypted code word ECM2. The multiplexed signal Strs2 is supplied to scrambling means SCR2 for scrambling the signal Strs2 under the control of code words CW2. The scrambling means supplies a signal Sscr2 to the output O21. Instead of the conditional access apparatus CAA of FIG. 1, the conditional access apparatus CAA2 of the invention does not have a control word generator but comprises storing means MEM in which a table is stored with control words CW2 and corresponding encrypted control words as entitlement control messages ECM2.

This table of control words and entitlement control messages can be generated centrally by an authorized person who distributes (for example, sends) it to the authorized users.

The storing means MEM are controlled by a control unit CPU which determines the set of control word CW2 and entitlement control message ECM2 that will be supplied to the scrambling means SCR2 and the multiplexing means MUX2, respectively. The read-out of the control words and the entitlement control messages may be chosen at random by the control unit CPU and changed as often as is deemed necessary to prevent unauthorized persons from cracking the scrambling control words.

In the case of theft of a conditional access apparatus, a new table of control words is sent to the other operating conditional access apparatuses at the transmitting side and, if necessary, a new service key (for example, a smart card) at the receiving side, and thereafter the stolen conditional access apparatus can no longer be used, for example, to receive scrambled information.

Instead of using the conditional access apparatus as described above it is also possible to implement the multiplexing, scrambling and the tables with control words and entitlement control messages in software.

It is also possible to use a service key (for example, a smart card as the prior art does) to enable the user of the control access apparatus CAA2 at the transmitting side to check whether the scrambling has been performed in the way as desired at the (mobile) transmitting side. Moreover, a service key may be used at the receiving side to further improve the operation of the receiving system RS.

The idea of the invention has been described hereinbefore on the basis of some examples. Those skilled in the art will be well aware of many different solutions within the scope of the invention concerned.

To further improve the operation of the conditional access apparatus, an alternative option is to implement the communication between the memory MEM and the scrambler SCR2 as a secure channel. This may be implemented by combining the scrambler and the memory in one unit.

What is claimed is:

1. A conditional access apparatus comprising:

multiplex means for multiplexing at least one signal and one encrypted control word;

scrambling means for scrambling the output signal of the multiplex means using at least one unencrypted control word;

first storing means for storing the at least one control word;

second storing means for storing the at least on encrypted control word; and means for reading out the first and second storing means;

wherein said conditional access system does not include a control word generator for generation of the at least one encrypted control word and one unencrypted control word.

2. The apparatus of claim 1, further comprising control means for controlling the means for reading out the first and second storing means.

3. A method of scrambling at least one signal, comprising the steps of:

multiplexing the at least one signal with an encrypted control word;

scrambling the multiplexed signal under the control of at least one unencrypted control word;

storing the at least one unencrypted control word and the at least one encrypted control word in storing means; and supplying the stored control words and encrypted control words for scrambling or multiplexing them, respectively, wherein the at least one encrypted control word and one unencrypted control word are not generated by a local control word generator.

4. A transmission system comprising:

multiplex means for multiplexing at least one signal and one encrypted control word;

scrambling means for scrambling the output signal of the multiplex means using at least one unencrypted control word;

first storing means for storing the at least one control word;

second storing means for storing the at least on encrypted control word; and means for reading out the first and second storing means;

wherein said tranmission system does not include a control word generator for generation of the at least one encrypted control word and one unencrypted control word.

5. The system of claim 4, further comprising control means for controlling the means for reading out the first and second storing means.

* * * * *